United States Patent
Walker et al.

(10) Patent No.: US 12,498,844 B2
(45) Date of Patent: *Dec. 16, 2025

(54) NEAR-VIEWING NOTIFICATION TECHNIQUES

(71) Applicant: Apple Inc., Cupertino, CA (US)

(72) Inventors: Laura L. Walker, Orinda, CA (US); Jiaying Wu, San Jose, CA (US); Andrew B. Watson, Los Gatos, CA (US); Tim H. W. Cornelissen, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/131,477

(22) Filed: Apr. 6, 2023

(65) Prior Publication Data

US 2023/0244364 A1 Aug. 3, 2023

Related U.S. Application Data

(63) Continuation of application No. 16/670,929, filed on Oct. 31, 2019, now Pat. No. 11,681,415.

(60) Provisional application No. 62/753,307, filed on Oct. 31, 2018.

(51) Int. Cl.
  *G06F 3/0484* (2022.01)
  *G06F 3/01* (2006.01)
  *G06F 9/54* (2006.01)

(52) U.S. Cl.
  CPC .......... *G06F 3/0484* (2013.01); *G06F 3/011* (2013.01); *G06F 3/017* (2013.01); *G06F 9/542* (2013.01)

(58) Field of Classification Search
  None
  See application file for complete search history.

(56) References Cited

U.S. PATENT DOCUMENTS

| | | |
|---|---|---|
| 8,856,948 B1 | 10/2014 | Robison et al. |
| 9,086,837 B1 | 7/2015 | Kang |
| 9,280,887 B2 | 3/2016 | Son |
| 9,380,562 B1 | 6/2016 | Vetter et al. |
| 9,524,631 B1 * | 12/2016 | Agrawal ............... G08B 21/18 |
| 9,588,586 B2 | 3/2017 | Rihn |
| 9,729,915 B2 | 8/2017 | Luk et al. |
| 9,977,507 B2 | 5/2018 | Katz |
| 10,360,876 B1 | 7/2019 | Rahman |

(Continued)

OTHER PUBLICATIONS

"A Facial Recognition Feedback System for Managing Distance Between Device and User." An IP.com Prior Art Database Technical Disclosure, Jan. 18, 2016.

(Continued)

*Primary Examiner* — Tuyetlien T Tran
(74) *Attorney, Agent, or Firm* — Kilpatrick Townsend & Stockton LLP

(57) ABSTRACT

Approaches for presenting user cues based on distance between an electronic device and an object are described. In some examples, content is displayed. First sensor data is received, which is indicative of a first distance between the electronic device and the object. A first version of a user cue relating to the first distance may be presented. Second sensor data is received, which is indicative of a second distance between the electronic device and the object. A second version of the user cue relating to the second distance may be presented.

20 Claims, 9 Drawing Sheets

(56) References Cited

U.S. PATENT DOCUMENTS

| | | | |
|---|---|---|---|
| 10,401,952 B2 | 9/2019 | Young et al. | |
| 10,445,935 B2 | 10/2019 | Schwarz et al. | |
| 10,712,817 B1 | 7/2020 | Ronngren | |
| 11,190,838 B2* | 11/2021 | Park | H04N 5/63 |
| 2001/0040671 A1 | 11/2001 | Metcalf | |
| 2005/0130623 A1* | 6/2005 | Narhi | H04M 1/72418 455/404.1 |
| 2005/0151882 A1* | 7/2005 | Donato | H04N 21/4882 348/553 |
| 2006/0093998 A1 | 5/2006 | Vertegaal | |
| 2007/0165931 A1* | 7/2007 | Higaki | G06T 7/251 382/128 |
| 2007/0279591 A1* | 12/2007 | Wezowski | G06F 3/013 351/208 |
| 2011/0252359 A1 | 10/2011 | England et al. | |
| 2011/0279277 A1* | 11/2011 | Li-Chung | G06Q 10/109 600/28 |
| 2012/0092466 A1* | 4/2012 | Choi | H04N 13/373 348/51 |
| 2013/0007665 A1* | 1/2013 | Chaudhri | H04L 51/224 715/833 |
| 2013/0033525 A1 | 2/2013 | Markiewicz et al. | |
| 2013/0044129 A1 | 2/2013 | Latta et al. | |
| 2013/0057573 A1* | 3/2013 | Chakravarthula | G06F 3/005 345/158 |
| 2013/0057702 A1 | 3/2013 | Chavan | |
| 2013/0262115 A1* | 10/2013 | Chuang | H04M 19/04 704/246 |
| 2013/0332721 A1* | 12/2013 | Chaudhri | H04M 1/72451 713/100 |
| 2014/0225931 A1* | 8/2014 | Plagemann | G06F 3/017 345/660 |
| 2014/0250447 A1* | 9/2014 | Schink | H04N 21/478 725/10 |
| 2014/0354535 A1* | 12/2014 | Chen | G09G 5/00 345/156 |
| 2015/0091947 A1* | 4/2015 | Rakow | G09G 5/373 345/667 |
| 2015/0176998 A1* | 6/2015 | Huang | H04W 4/021 701/400 |
| 2015/0178626 A1 | 6/2015 | Pielot et al. | |
| 2015/0189356 A1 | 7/2015 | Shen | |
| 2015/0242993 A1* | 8/2015 | Raman | G06F 3/017 345/589 |
| 2015/0269009 A1* | 9/2015 | Faaborg | A61B 5/024 719/315 |
| 2015/0332576 A1* | 11/2015 | Son | G06F 3/011 351/158 |
| 2015/0338998 A1 | 11/2015 | Chathoth et al. | |
| 2015/0362520 A1 | 12/2015 | Wells et al. | |
| 2015/0365306 A1 | 12/2015 | Chaudhri et al. | |
| 2016/0026241 A1* | 1/2016 | Leung | G06F 3/012 345/156 |
| 2016/0195925 A1 | 7/2016 | Nguyen et al. | |
| 2016/0202114 A1 | 7/2016 | Alameh et al. | |
| 2017/0040002 A1 | 2/2017 | Basson et al. | |
| 2017/0068314 A1* | 3/2017 | Fu | G06V 40/193 |
| 2017/0123615 A1* | 5/2017 | Yin | G06F 9/542 |
| 2017/0287112 A1 | 10/2017 | Stafford et al. | |
| 2018/0199104 A1* | 7/2018 | Park | H04N 21/4436 |
| 2018/0252931 A1 | 9/2018 | Kim-Whitty | |
| 2018/0349659 A1 | 12/2018 | Manzari et al. | |
| 2018/0349957 A1 | 12/2018 | Kim-Whitty | |
| 2019/0027028 A1* | 1/2019 | Fields | G08G 1/166 |
| 2019/0027118 A1* | 1/2019 | Zuo | G09G 5/373 |
| 2019/0268460 A1* | 8/2019 | Agrawal | H04W 4/021 |
| 2019/0317659 A1 | 10/2019 | Johnson et al. | |
| 2019/0339770 A1 | 11/2019 | Kurlethimar et al. | |
| 2020/0241119 A1 | 7/2020 | Asghari et al. | |
| 2020/0242280 A1 | 7/2020 | Pavloff et al. | |

OTHER PUBLICATIONS

"Face Tracking with ARKit", Developer: Apple Inc. Tech Talks Video, Screen Shot of the Video home. Available Online at: https://developer.apple.com/videos/play/tech-talks/601/, 2019, 2 pages.

"Face Tracking with ARKit", Developer: Apple Inc. Tech Talks Video, Written description of the Video. Available Online at :https://developer.apple.com/videos/play/tech-talks/601/, 2019, 3 pages.

Final Office Action, mailed Dec. 29, 2021, in U.S. Appl. No. 16/670,929. 22 pages.

"Final Office Action,", mailed Dec. 1, 2022, in U.S. Appl. No. 16/670,929. 24 pages.

"Non-Final Office Action," mailed Jun. 29, 2021, in U.S. Appl. No. 16/670,929. 18 pages.

"Non-Final Office Action," Jul. 21, 2022, in U.S. Appl. No. 16/670,929. 23 pages.

"Non-Final Office Action," Oct. 14, 2020, in U.S. Appl. No. 16/670,929. 25 pages.

"Notice of Allowance," Feb. 21, 2023, in U.S. Appl. No. 16/670,929. 10 pages.

Deng, "Tencent Adds Eye Protection Function to Videos after Beijing Calls for Action to Prevent Myopia in Children", South China Morning Post, Sep. 27, 2018, 1 page.

Hutchinson et al., "Human-Computer Interaction Using Eye-Gaze Input", IEEE Transactions on Systems, Man and Cybernetics, vol. 19, Issue 6, 1989, pp. 1527-1534.

Konig et al., "A new context: Screen to Face Distance", 8lh International Symposium on Medical Information and Communication Technology, 2014, 5 pages.

Li et al., "Look into My Eyes: Fine-grained Detection of Face-screen Distance on Smartphones", 12th International Conference on Mobile Ad-Hoc and Sensor Networks, 2016, 8 pages.

Lopez-Gill, "Optica, Vision en Murcia", Available Online at: https://www.um.es/civium/miembro/norberto-lopez-gil/, Oct. 25, 2019, 3 pages.

Marquardt et al., "Informing the Design of Proxemic Interactions", IEEE Pervasive Computing, vol. 11, Issue 2, Jan. 10, 2012, pp. 14-23.

Palladino, "This App Uses the iPhone X's TrueDepth Camera to Conjure 3D Illusions", Mar. 2, 2018, 4 pages.

* cited by examiner

NEAR-VIEWING NOTIFICATION TECHNIQUES

CROSS-REFERENCES TO RELATED APPLICATIONS

This application is a continuation of U.S. patent application Ser. No. 16/670,929, filed Oct. 31, 2019, entitled "Near-Viewing Notification Techniques," which claims the benefit of U.S. Provisional Application No. 62/753,307, filed Oct. 31, 2018, entitled "Near-Viewing Notification Techniques." The disclosures of these applications are incorporated by reference herein in their entirety.

BACKGROUND

Certain activities, when performed for an extended period of time, may cause eye strain. As a result of and/or in an attempt to alleviate such eye strain, people may naturally reduce the distance between their eyes and whatever it is they are focusing on. For example, when people read for an extended period of time, they may gradually move the reading material closer to their eyes over time. This may be to account for their eyes becoming more fatigued over time. This same phenomenon has been observed in users who view screens of electronic devices, which have become so ubiquitous and useful, that people tend to utilize them throughout the day. For example, electronic devices can be used for work (e.g., reading/responding to emails, working on/reviewing documents, etc.) as well for personal enjoyment (e.g., reading, watching video content, playing games, etc.).

BRIEF DESCRIPTION OF THE DRAWINGS

Various examples in accordance with the present disclosure will be described with reference to the drawings, in which.

DETAILED DESCRIPTION

Figure 1:
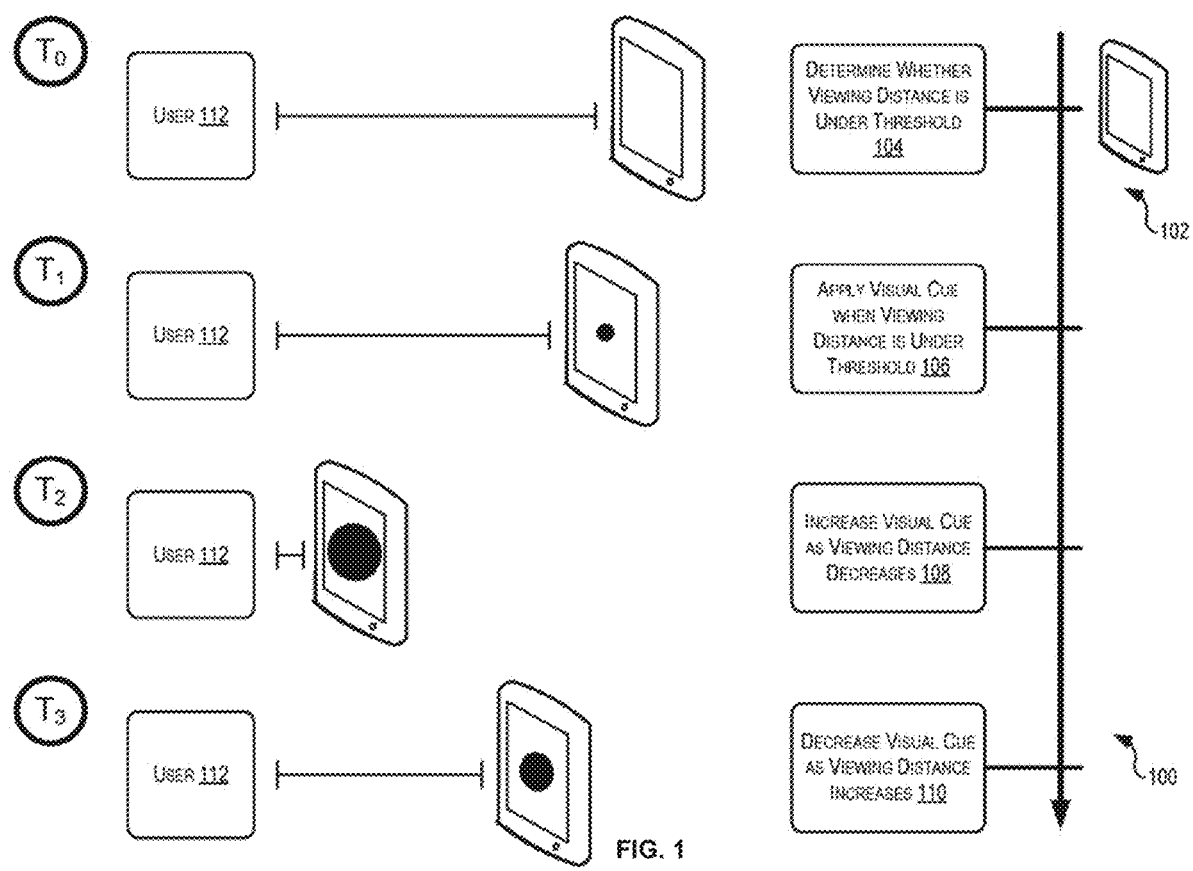
FIG. 1 is an example flowchart showing a process and a block diagram for illustrating example techniques for implementing near-viewing notification techniques, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media for managing, in real-time, a viewing distance between a user and a screen (e.g., a display screen of an electronic device). Managing the viewing distance generally includes measuring a viewing distance with respect to the screen (e.g., the air gap between the user's face and the screen), determining whether the distance is too small (e.g., the user is too close to the screen), and, when the distance is too small, prompting the user to adjust the distance (e.g., move the screen further from the user's face). Prompting may be achieved using notifications in the form of user interface (UI) cues (e.g., visual, haptic, and/or audio notifications/interruptions) that may presented at the electronic device and, in some examples, may change with respect to the distance between the screen and the user's face (e.g., the size of a visual UI cue may increase as the distance decreases and decrease as the distance increases). In this manner, the UI cue may be used as a feedback mechanism to coach the user's behavior.

Turning now to a particular example, a near-viewing control engine of an electronic device such as a smartphone or tablet may cause a front-facing camera of the electronic device to take a face detection sample every few seconds. The near-viewing control engine may use these samples to identify a user's face (e.g., within a bounding box) and determine a distance between the user's face and the electronic device (e.g., an initial distance). If the near-viewing control engine determines that a first criterion is satisfied (e.g., the user's face is too close to the electronic device based on a comparison of the distance to a predefined viewing distance threshold), the near-viewing control engine may determine an appropriate time for presenting notification such as a UI cue. This may include the near-viewing control engine determining that the user's face remains in front of the electronic device (e.g., the user has not turned away from the electronic device). When appropriate, the near-viewing control engine may present a UI cue at the electronic device in the form of a user interface element, a haptic alert, a sound, a pop-up, a notification, or any other form of feedback capable of capturing the user's attention. During this time, the near-viewing control engine may continue to collect sensor data and use the sensor data to determine whether conditions have changed (e.g., the user increased or decreased the viewing distance). Depending on how the conditions have changed (e.g., if a second criterion has been satisfied), the near-viewing control engine can adjust the current cue, present additional cues, and/or cease presenting the cue. The near-viewing control engine may also track the viewing distance over time and, even if the distance does not get too small during a particular time period, prompt the user to take a visual break. For example, this may prompt the user to rest her eyes or perform some predefined exercise (e.g., focus on an object other than the screen). If the user does not take the visual break and/or if the amount of time the user is viewing the screen exceeds a timing threshold, the near-viewing control engine may provide a more extreme UI cue (e.g., the device could lock out the user or otherwise enforce that the user take a visual break).

The type of UI cue provided to a user may depend on the use case. For example, in a use case for a child, the UI cue may render content on the screen completely useless, as opposed to simply blurring the content or obscuring a portion of the content. This may increase the likelihood that the child increases the viewing distance, while also avoiding the possibility that the child attempts to cheat the system by viewing blurred content. For example, a black spot may be placed over the center of the screen that grows in size as the device is brought nearer to the child's face. This feedback may be helpful to teach the child an appropriate distance for viewing the content. In an example use case for adults, some level of "cheating" may be allowed for a brief period of time, by providing a UI cue that does not fully disrupt the content. In this example, opaque bars (e.g., colored bars) may be presented on the screen (e.g., at the edges) that saturate to deeper opaqueness or deeper color as the device is brought near to the face. After a period of time (e.g., 5, 7, 10 seconds, etc.), the bars can pulse along with vibration before the content is locked out, thus enforcing the break. The UI cues can include opaque UI cues, a black circle, oval, blob, or other shape in the center or near-center of the screen. UI cues can also include haptic and/or audio feedback. In some examples, the UI cues can grow in intensity as the device is moved closer to the user's face and/or after a certain amount of time. Additionally, the techniques may only operate using certain applications, but not with others (e.g., the opaque UI cues may never cue the user to take a break during an emergency phone call (e.g., to 911 or the like). A parent may set a child mode on a child's device, and an adult mode may be more configurable to allow more flexibility.

In addition to providing user feedback, it is possible to track data relating to viewing distance in an application on the device (e.g., a health-related software application). For example, the near-viewing control engine may track "screen time" (e.g., the amount of time a user is looking at their screen), and the near-viewing control engine may be integrated with viewing distance data, which would allow the near-viewing control engine to track how close and/or for how long the user uses her device, and present this data in a dashboard of the near-viewing control engine or some other application. This could enable the near-viewing control engine to monitor and influence the user's near-viewing behaviors. The near-viewing control engine may encourage near-viewing behaviors by allowing users to earn "rewards" for maintaining a an appropriate viewing distance and/or adjusting the viewing distance when nudged to do so (e.g., break-taking could be nudged rather than a forced screen lock out).

In some examples, the near-viewing control engine may include user settings (or may include settings within a global settings application), where the user can turn the techniques off completely or set limits on how closely they are allowed to view the device and/or how long they can view the device. Once the settings are set, the device can provide UI cues as the device crosses these distance and/or time thresholds.

Turning now to the figures, FIG. 1 is an example flowchart showing a process 100 and a block diagram for illustrating example techniques for implementing near-viewing notification techniques, according to at least one example. The diagram includes an electronic device 102 that perform the process 100. At block 104, the process 100 may include the electronic device 102 determining (e.g., at time T0) whether a viewing distance of a user 112 with respect to a device is under a threshold (e.g., whether the user 112 is "too close" to the device). At block 106, the process 100 includes the electronic device 102, when it is determined that the viewing distance is under the threshold, applying a visual cue (e.g., at T1). At block 108, the process 100 includes the electronic device 102 device increasing the visual cue as the viewing distance decreases (e.g., at T2). At block 110, the process 100 includes the electronic device 102 decreasing the visual cue as the viewing distance increases (e.g., at T3).

Figure 2:
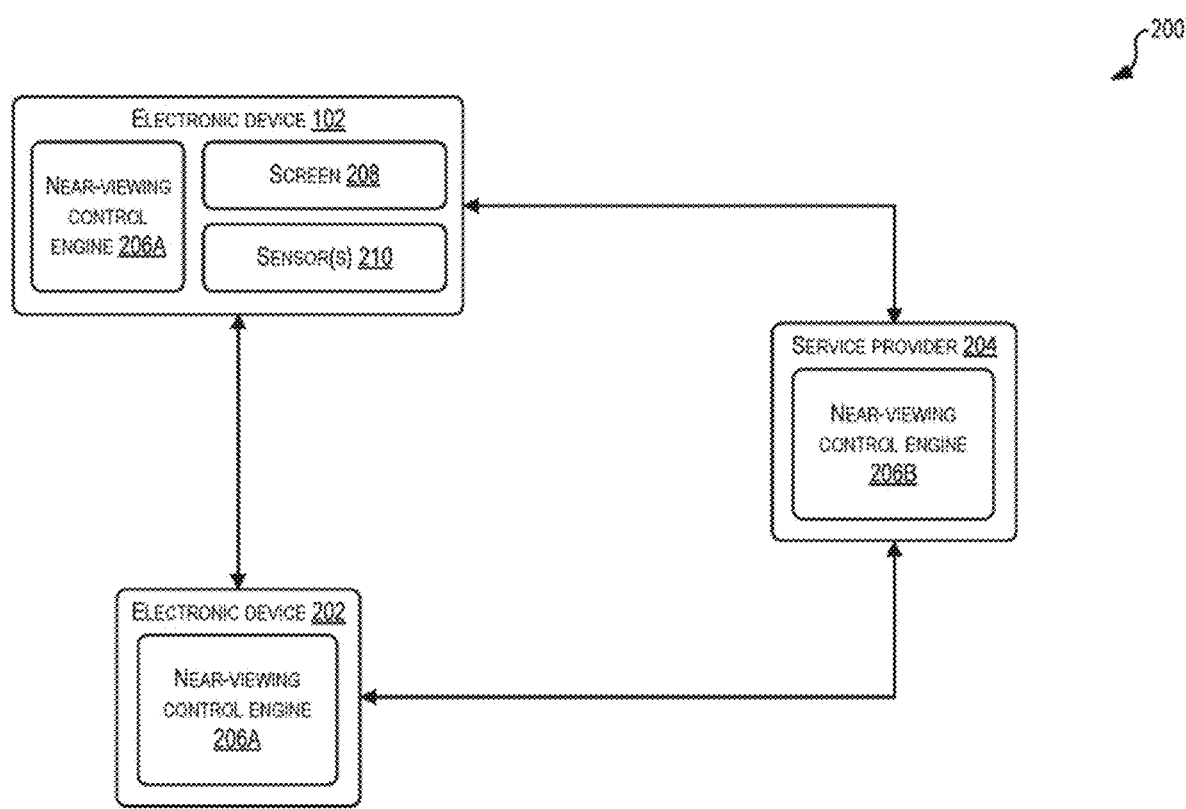
FIG. 2 is an example block diagram for illustrating a system for implementing the techniques described herein, according to at least one example.

FIG. 2 is an example block diagram for illustrating a system 200 for implementing the techniques described herein, according to at least one example. The system 200 includes the electronic device 102, a second electronic device 202, and a service provider 204. The elements of the system 200 may be interconnected via one or more networks to enable communications between the elements of the system 200. In some examples, the electronic devices 102 and 202 share data directly with each other and/or may share data via the service provider 204. The electronic device 102 may share data and/or notifications with the electronic device 202 in real-time and/or in the aggregate (e.g., as a report of such data). The real-time notifications may correspond to the cues being presented on the electronic device 102. This may enable a parent or other user of the electronic device 202 to intervene, e.g., to assist a child of the electronic device 102 with adjusting the viewing distance.

The electronic device 102 and the second electronic device 202 may be any suitable device such as a smartphone, mobile phone, laptop, tablet, monitor, wearable device such as a watch, etc. The service provider 204 may include any suitable combination of server computers, which may be distributed logically and/or physically.

The electronic device 102 includes a near-viewing control engine 206A, a screen 208, and sensor(s) 210. The near-viewing control engine 206 includes any suitable combination of hardware, firmware, and/or software configured to implement the techniques described herein. At the screen 208, content of the electronic device 102 is output. The sensor(s) 210 are configured to capture sensor data of a user and/or other objects in front of the electronic device 102, along with other condition data with respect to the electronic device 102. For example, the sensor(s) 210 may include any kind of depth sensor or camera (e.g., Red Green Blue (RGB) camera, a Time of Flight (ToF) camera, an infrared (IR) camera, a structured light camera, and/or any other suitable sensor or camera for sensing conditions surrounding the electronic device 102). In some examples, a structured light sensor or a ToF camera may be used for depth detection, and an RGB image (from an RGB camera) may be used detect a face. In some examples, an RGB camera may be used in connection with a computer vision and machine learning model to obtain data to determine the user's face and depth thereof. In some examples, multiples of the sensor 210 may be included. For example, an array of ToF sensors may be used in connection with computer vision to obtain data to determine the user's face and depth thereof. In some examples, the sensor 210 may include a proximity sensor. For example, the proximity sensor may be calibrated and configured to sense objects within a predefined distance (e.g., a desired minimum viewing distance) away from the electronic device 102. If the object (e.g., a face) is detected by the proximity sensor it can be assumed that the actual viewing distance is smaller than the desired minimum viewing distance. If the object (e.g., the face) is not detected by the proximity sensor, it can be assumed that the actual viewing distance is greater than the desired minimum viewing distance.

As illustrated in FIG. 2, the service provider 204 may include a version of the near-viewing control engine 206B. This may enable the service provider 204 to perform at least some, if not all, of the techniques described herein. For example, data obtained from the sensors 210 may be transferred to the service provider 204 via a network connection, the service provider 204 may process the data and make decisions regarding presentation of cues, and instruct the electronic device 102 to present the cues.

In some examples, the electronic device 102 and the electronic device 202 may be part of a shared device group. For example, the electronic device 202 may be associated with a parent and the electronic device 102 may be associated with a child. The shared device group may enable the electronic device 202 to control aspects of the electronic device 102 and/or receive near-viewing data from the electronic device 102. For example, at the electronic device 202, may be presented a dashboard that includes near-viewing data for all other electronic devices 102 that are members of the shared device group. From this dashboard, a user of the electronic device 202 may adjust near-viewing settings of the electronic device 102 (e.g., a threshold distance, timing thresholds, maximums viewing thresholds, etc.) and other electronic devices belonging to the group. The near-viewing control engine 206A on the electronic device 202 may send an instruction to the near-viewing control engine 206A of the electronic device 202 to implement these adjustments to the settings. In some examples, the data from the electronic device 102 may be used shared with the second electronic device 202 and/or the service provider 204 for scientific analysis (e.g., to prepare studies relating to eye strain). In some examples, a dashboard may be provided within a health application on the electronic device 102. Even if the cues are not being presented (e.g., a user setting has been toggled to turn off the cueing), viewing distance data may be gathered, processed, and presented in the dashboard. This may be useful for the use to see how their viewing habits compare over time, with respect to applications, with respect to content, with respect to time, etc.

FIGS. 3, 4, 5, 6, 7, and 8 illustrate example flow diagrams showing processes 300, 400, 500, 600, 700, and 800 according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

Figure 3:
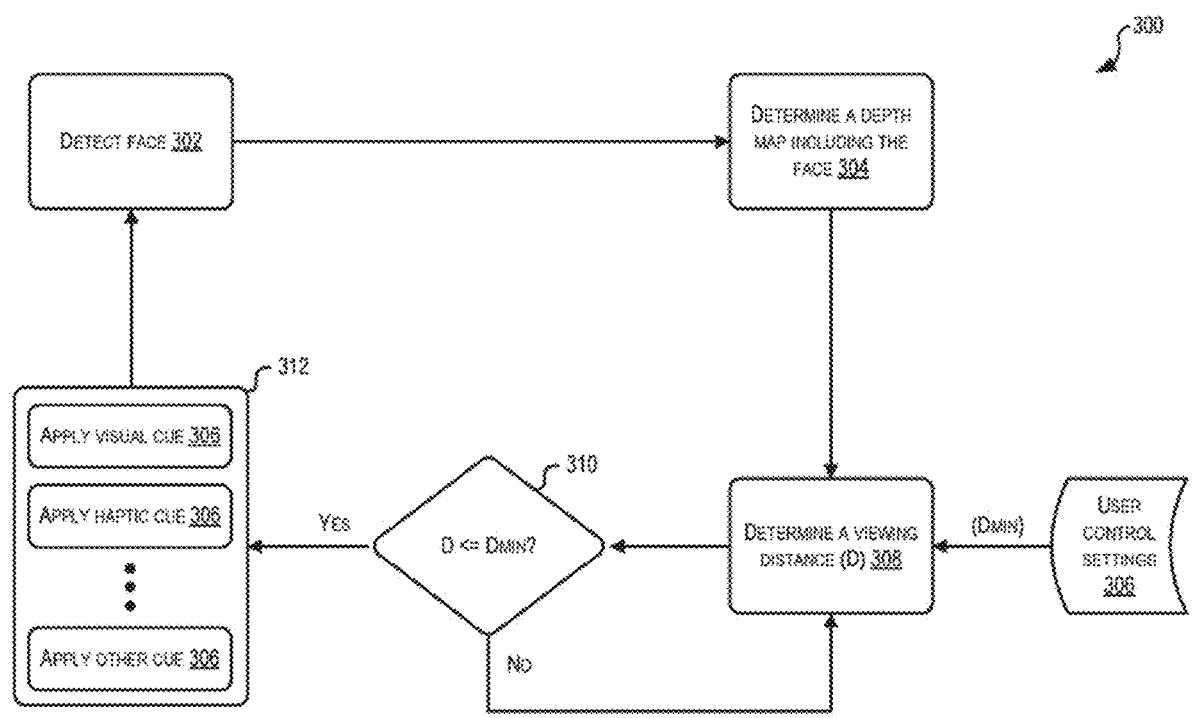
FIG. 3 is an example flow chart showing a process for illustrating example techniques for implementing near-viewing notification techniques, according to at least one example.

FIG. 3 is an example flow chart showing a process 300 for illustrating example techniques for implementing near-viewing notification techniques, according to at least one example. In particular, the process 300 relates to a general process for determining whether to present a UI cue at an electronic device. The process 300 is implemented by the near-viewing control engine 206 executing in the service provider 204 or the electronic device 102.

The process 300 begins at block 302 by the electronic device 102 detecting a face. This may include using data from a front facing camera (e.g., an RGB camera, IR camera, or other camera described herein). In some examples, an application programming interface may be used to obtain data relating to a detected face. For example, an existing application on the electronic device 102 may use face detection for authentication at the electronic device 102. This application (or data obtained from this application) may be used to perform at least part of the block 302. In some examples, at the block 302, the electronic device 102 also applies a bounding box around the face. This may enable the system to process depth data in the bounding box only and ignore other data outside the box (e.g., at block 304).

At the block 304, the process 300 includes the electronic device 102 determining a depth map including the face. For example, a median of the depth values in the bounding box may be used to define the depth. In some examples, a depth camera may be used to determine the depth map. In some examples, the blocks 302 and 304 are performed using data output from more than one sensor (e.g., from an IR camera and an RGB camera). In some examples, if the analysis is based on a depth camera, in some cases, it may not first detect that there is a head/face in view, because a depth map of the face is what is used for face identification (e.g., for unlocking the device or the like). In some examples, eye tracking can be used to detect when a user is viewing a device too closely. For example, based on the angle of the pupils (e.g., the convergence angle), the electronic device 102 may be able to detect how close the device is to the face. A lower pupil angle would imply that the device is closer, because the user is having to focus on a point that is closer to the user.

Additionally, eye tracking may also be used to detect how often the user is blinking, which is factor is detecting and preventing digital eye strain, which may lead to a sensation of dry, irritated eyes. But the idea is to prompt the user take a break to blink, refreshing the tear film having reminders for the user to relax her eyes from holding this near triad position. Each factor can be detected separately, and one, all, or some subset of the data can be used to cue the user to take a break. They electronic device 102 may check how close the user is to the screen, may check how often the user is blinking, or may check both. Different cues may be provided, depending on the type of feedback (e.g., a blinking set of eyes to encourage blinking and/or a black dot to adjust distance). And when a "remember to blink feature" is turned on, a dosing curve can be calculated (e.g., an ocular surface wetting factor) to create visually healthy screen behavior for the users. Thus, the UI cue may be a blink indicator that reminds the user to blink. Additionally, the UI cue could be a popup message that indicates that the user needs to take a break.

At block 306, the process 300 includes receiving as input a set of user control settings. The user control settings may be configured by a user of the electronic device 102. In some examples, the user control settings may include a desired minimum distance (Dmin) (e.g., a threshold distance) between the user and the screen of the electronic device 102. In some examples, the minimum distance may be set based on the average arm length (e.g., around 63 cm for adults). In some examples, the minimum distance may be set between 20-50 cm. In some examples, the electronic device 102, whether based on user input or by accessing a user profile, may determine the age of the user, and if she is a child (based on some age threshold), the techniques may be modified for a children's profile (e.g., shorter minimum distance, different conditions for viewing and dismissing cues, etc.).

At block 308, the process 300 includes the electronic device 102 determining a viewing distance (D). The viewing distance may be determined based on the depth map determined at the block 304. For example, the viewing distance may be determined based on an average depth of pixels in a bounding box as measured across set of samples. The sampling rate may be variable over the set and the set of samples may, in some examples, not be continuously collected. For example, determining the viewing distance may also include excluding invalid samples, outlier samples, and other such samples.

At block 310, the process 300 includes the electronic device determining whether viewing distance (D) is less than or equal to the desired minimum distance (Dmin). If the answer is "NO", the process 300 returns to the block 308, at which, the electronic device 102 determines a new viewing distance (D). If the answer is "YES", the process 300 proceeds to block 312, at which, the electronic device 102 applies a cue (e.g., a visual cue 314, a haptic cue 316, or other cue 318). The other cues 318 include any other cue such as audio. In some examples, at the block 312, the electronic device 102 may also determine which of the cues 314, 316, and 318 to apply. This may include selecting a cue based on the user control setting received at the block 306. For example, the selected cue may depend on the age of the user, disabilities of the user, the content being presented at the electronic device 102 (e.g., audio, text, video, a feed of posts, etc.), the application being used (e.g., email, social networking, video player, audio player, etc.), historical data regarding previous cues (e.g., frequency, duration, etc. at which previous cues were presented, dismissed, or otherwise interacted with), and any other aspect relating to the context surrounding the cue.

According to the process 300, after the electronic device 102 applies the cue at 312, the process 300 returns to the block 302, at which, the electronic device 102 detects the face again. In some examples, the process 300 may skip the block 302 and instead return to one of the blocks 304 or 308.

Figure 4:
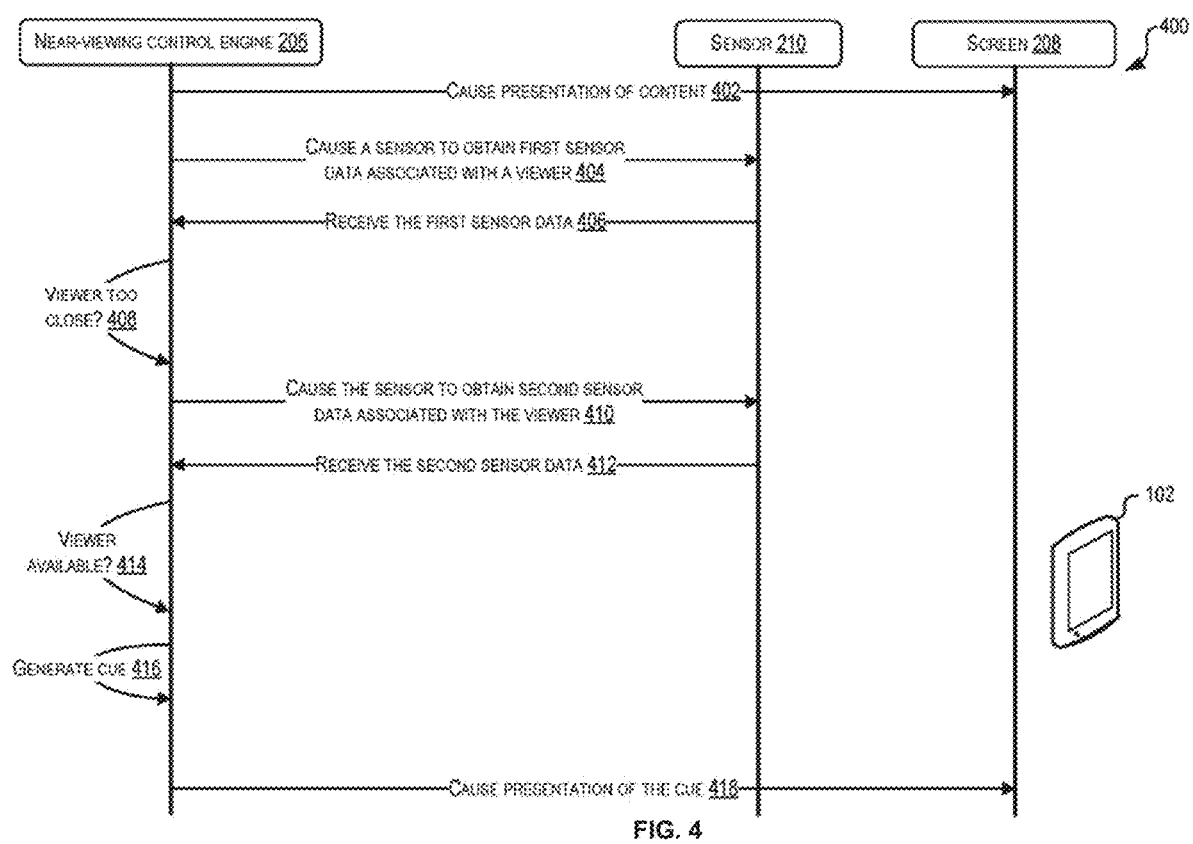
FIG. 4 is an example diagram showing a process for illustrating example techniques for implementing near-viewing notification techniques, according to at least one example.

FIG. 4 is an example diagram showing a process 400 for illustrating example techniques for implementing near-viewing notification techniques, according to at least one example. In particular, the process 400 illustrates how elements of the electronic device 102 such as the near-viewing control engine 206 controls and uses data from the sensor 210 to determine a cue for the screen 208. Thus, the process 400 is implemented by elements of the electronic device 102.

The process 400 begins 402 by the near-viewing control engine 206 causing presentation of content at the screen 208. The content may any suitable content capable of presentation on the electronic device 102.

At 404, the process 400 includes the near-viewing control engine 206 causing the sensor 210 to obtain first sensor data associated with a viewer. The viewer may be the person who is viewing the content on the screen 208. The first sensor data may include data useable to determine a distance of the viewer from the electronic device 102.

At 406, the process 400 includes the near-viewing control engine 206 receiving the first sensor data from the sensor 210. The first sensor data may be received from the sensor 210 for a predefined time period (e.g., 5 minutes), until a predefined number of valid samples have been obtained during a predefined time period (e.g., 20% valid samples over 5 minutes), or until a predefined amount of the predefined number of valid samples have been obtained (e.g., 3 samples of valid samples over 5 minutes). The first sensor data may be obtained at a first sampling rate.

At 408, the process 400 includes the near-viewing control engine 206 determining whether the viewer is too close. This may include the near-viewing control engine 206 determining, based on the first sensor data, that a criterion relating to the viewing distance is satisfied. In some examples, this may include the near-viewing control engine 206 using the first sensor data to determine whether an average viewing distance or a viewing distance across a number of samples is less than or greater than a threshold distance. A viewing distance that is greater than the threshold distance may prompt no action, while a viewing distance that is less than the threshold distance may prompt an action (e.g., a cue to adjust the viewing distance). Although, in some examples, a viewing distance that is greater than the threshold distance may also prompt an action. For example, the near-viewing control engine 206 may reference a maximum threshold distance and a minimum threshold distance, and take different actions depending on where the viewing distance is in a range extending between the maximum and the minimum. The maximum threshold distance may correspond to a largest desired viewing distance. The minimum threshold distance may correspond to a smallest desired viewing distance. When the viewing distance exceeds the maximum threshold distance, the near-viewing control engine 206 may prompt the user to reduce the viewing distance. When the viewing distance is between the maximum and the minimum, the near-viewing control engine 206 may not prompt the user to take any action. When the viewing distance is less than the minimum, the near-viewing control engine 206 may prompt the user to increase the viewing distance. Any of the promptings described herein may be achieved using any of the cuing approaches described herein. In some examples, 408—whether the viewer is too close—may also include a second question—whether the viewer is too close for too long. The too long portion may be determined with respect to a timing threshold and used to determine whether the viewer's viewing is problematic.

At 410, the process 400 includes the near-viewing control engine 206 causing the sensor 210 to obtain second sensor data associated with the viewer. This may include the near-viewing control engine 206 sending an instruction to the sensor 210 to obtain the second sensor data.

At 412, the process 400 includes the near-viewing control engine 206 receiving the second sensor data. The second sensor data may be received for a predefined time period, until a predefined quantity of valid samples have been collected, or in any other manner. The second sensor data may be obtained at a second sampling rate.

At 414, the process 400 includes the near-viewing control engine 206 determining whether the viewer is available for viewing a cue. This may include the near-viewing control engine 206 determining, based on the second sensor data, that a criterion relating to the viewing distance is satisfied (e.g., the viewer is still viewing the electronic device 102). For example, the approaches described herein may be configured to avoid presenting cues after the behavior has changed and/or the viewer is otherwise no longer viewing the screen.

At 416, the process 400 includes the near-viewing control engine 206 generating a cue. Generating the cue may depend on a set of rules. For example, depending on electronic device settings, a profile of the user, ambient light conditions, content being presented, application being accessed, time of day, duration of an infraction (e.g., viewing distance below the threshold), number of infractions during a set time period, etc., the near-viewing control engine 206 may generate the cue. As described herein, more obtrusive cues may be generated under certain conditions, while less obtrusive cues may be generated under other conditions.

At 418, the process 400 includes the near-viewing control engine 206 causing presentation of the cue at the screen 208. In some examples, the near-viewing control engine 206 may provide instructions for presenting the cue (e.g., present for 10 seconds) and/or may include a feedback loop for determining whether the cue should continue to be presented (e.g., present until the user moves the device away from her face).

Figure 5:
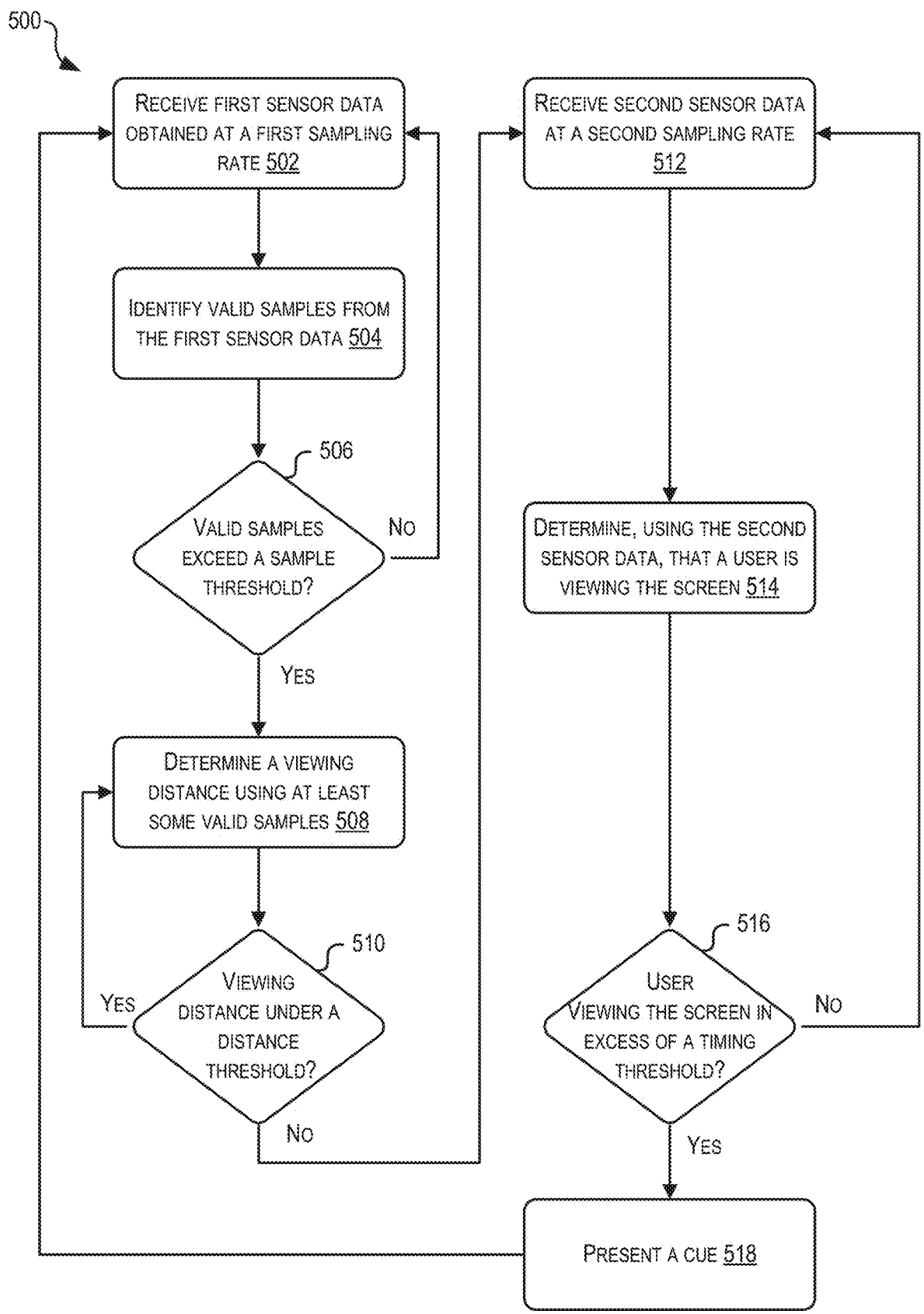
FIG. 5 is an example flow chart showing a process for illustrating example techniques for implementing near-viewing notification techniques, according to at least one example.

FIG. 5 is an example flow chart showing a process 500 for illustrating example techniques for implementing near-viewing notification techniques, according to at least one example. In particular, the process 500 relates to a process for iteratively evaluating sensor data with respect to a set of thresholds to determine whether to present a cue (e.g., blocks 502 to 510) and, if so, when to present a cue (e.g., blocks 512 to 518). The process 500 is performed by the near-viewing control engine 206 executing in the electronic device 102 or the service provider 204.

The process 500 begins at block 502 by the electronic device 102 receiving first sensor data obtained at first sampling rate. For example, the electronic device 102 may instruct a first sensor to sample at a rate of 0.1 to 0.5 Hz. In some examples, the first sensor data may be obtained for a predefined time period (e.g., 5 minutes), until a number of samples have been obtained (e.g., 60), and/or until a valid number of samples have been obtained (e.g., equal to or less than the number of samples (see block 504)). The first sensor data may be received while content (e.g., an application, text, video, graphics, etc.) is presented at the electronic device 102.

At block 504, the process 500 includes the electronic device 102 identifying valid samples from the first sensor data. A valid sample may be one in which a user's face is visible. If the electronic device 102 cannot determine whether or not a sample depicts the user's face, or at least without a sufficient amount of confidence, the electronic device 102 may discard the sample.

At block 506, the process 500 includes the electronic device 102 determining whether the valid samples determined at 504 exceeds a sample threshold. The sample threshold may indicate a percentage or quantity of samples that exceed the distance threshold and/or which the electronic device 102 obtains before determining a viewing distance (see block 508). The sample threshold may be a percentage or quantity of the valid samples identified at 504 as compared to a total number of samples obtained. A valid sample may be one that includes a face and which can be used to obtain a distance.

In accordance with a determination at the block 506 that the sample threshold is not exceeded, the process 500 returns to the block 502, at which, the electronic device 102 receives additional first sensor data. In accordance with a determination at the block 506 that the sample threshold is exceeded, the process 500 proceeds to block 508.

At the block 508, the process 500 includes the electronic device 102 determining a viewing distance using at least some valid samples. This may include taking at least some portion of the valid samples identified at the block 504, after identifying a suitable number of the samples at the block 506, and comparing these samples to arrive at a viewing distance. For example, this may include detecting the eyes of the user and determining average depth values for one or more pixels for one eye or both eyes. In addition to the user's eyes, other features of the face may also be used alone and in combination with the user's eyes to determine the viewing distance. In some examples, determining the viewing distance may include determining an average depth for each sample (or bounding box including a face within each sample) by averaging the depth values for each pixel, and determining the viewing distance for a set of valid samples by averaging the average depths for each sample. In some examples, the averages for corresponding pixels across a set of valid samples may be determined, and then these averages may be averaged to arrive at the viewing distance. In any event, the viewing distance may indicate an average distance between the user's face and the electronic device 102. In some examples, instead of or in addition to averaging the depths of each sample, determining the viewing distance may include taking using a median value for a set of samples, using a percentile of a set of samples, or using any other suitable method for approximating the viewing distance. In some examples, the viewing distance may also represent the period of time over which the average was obtained (e.g., last four minutes, last 30 seconds, etc.). The viewing distance may be the distance between a point of reference on the user's face (e.g., an averaged location in space) and a point of reference on the electronic device 102 (e.g., a calibrated location that represents a topmost surface of the screen).

In some examples, determining the viewing distance at the block 508 may be achieved using a depth camera combined with face detection. For example, the first sensor data may be obtained from a face depth sensor package (e.g., a front-facing dot projector for projecting dots on the face, a front-facing IR camera for reading the does from the projector and capturing images of the dots, and a front-facing IR illuminator for illuminating the face) alone and/or in combination with a depth camera. In some examples, data from the face depth sensor package may be used to identify a face and a viewing distance.

In some examples, one or more predictive models may be used to determine the viewing distance at the block 508. For example, a machine learning model may be trained to predict distances of pixels in an RGB or IR image received from one of the front-facing sensors.

In some examples, determining the viewing distance at the block 508 may be achieved using a combination of computer vision and face geometry. For example, this approach may rely the position of facial features relative to one another, which may be acquired at an earlier stage (e.g., as part of a calibration step during device setup). As an example, determining the viewing distance may be based on a known distance between the user's eyes (e.g., obtained previously), the intrinsic parameters of a camera, and a determination that the eyes are some number of pixels apart and the face is rotated with respect to some known plane. This information may be sufficient to determine that the face is some distance value away from the electronic device 102.

In some examples, determining the viewing distance at the block 508 may be achieved by combining data indicative of an accurate measure of distance (e.g., data from one or more single pixel ToF sensors) with another source of information about whether the object in front of the sensor is a face (e.g. an RGB camera combined with a face detection algorithm). In some examples, determining the viewing distance may be iterative based on the techniques described herein. For example, a first technique may be applied that is requires the lowest amount of processing resources and/or takes the smallest amount of time. If this technique is sufficient for determining the viewing distance, the electronic device 102 may stop. If the viewing distance is not determined or at least not with enough confidence, the electronic device 102 may continue with the next technique, which may take more time and/or be more resource intensive than the first technique. This approach may be repeated at least until the viewing distance is determined or the most resource intensive technique has been tried.

At block 510, the process 500 includes the electronic device 102 determining whether the viewing distance is under a distance threshold (e.g., whether or not a criterion relating to the viewing distance has been satisfied). In some examples, this may include comparing the viewing distance determined at the block 508 with the distance threshold, which may be predefined. As described herein, the distance threshold may be obtained from a user settings, a user profile, manually entered in the near-viewing control engine 206 application, or obtained in any other suitable manner. In some examples, the distance threshold may be defined by an administrator and shared with a set of devices. For example, in an educational context, a teacher may define or select a school mode, which may define the distance threshold for a set of fungible devices used by students in the classroom. To do so, the near-viewing control engine 206 may include functionality for an administrator portal and/or dashboard. In some examples, there could also be a parent mode, a work mode, docked mode, driving mode, and any other predefined mode. In each of the modes, the conditions under which the user is prompted may vary and, in some examples, the prompting may be disabled completely (e.g., in a driving mode).

In accordance with a determination at the block 510 that the viewing distance is under the distance threshold, the process 500 returns to the block 508 at which the content continues to be presented at the electronic device 102 and the sensor data is obtained. In accordance with a determination at 510 that the viewing distance exceeds the distance threshold, the process 500 proceeds to block 512. At the block 512, the process 500 includes the electronic device 102 receiving second sensor data at a second sampling rate. The second sensor data may be received from the first sensor (e.g., the same sensor that obtained the first sensor data) or a different sensor. For example, an RGB camera may be used to obtain the first sensor data and an IR camera may be used to obtain the second sensor data. In some examples, the electronic device 102 may instruct the sensor to sample at sampling rate that is greater than the first sampling rate (e.g., 3 Hz to 7 Hz). This greater sampling rate may be useful to determine an appropriate time for presenting a cue, and one in which the user is actually looking at the screen. Thus, while determining whether to present the cue (e.g., based on the first sensor data) may take place over a few minutes, determining when to present the cue (e.g., based on the second sensor data) may take place in a matter of seconds, as a result of the faster sampling rate. In some examples, the second sensor data may continue to be received at the first sampling rate.

At 514, the process 500 includes the electronic device 102 determining, using the second sensor data, that the user is viewing the screen (e.g., whether or not a criterion relating to the viewing distance has been satisfied). This may include detecting the user's face in the second sensor data At 516, the process 500 includes the electronic device 102 determining whether the user is viewing the screen in excess of a timing threshold (e.g., a criterion relating to the viewing distance). For example, the user may be considered to be "viewing" the screen, if the electronic device 102 identifies the user in 1-3 seconds worth of continuous samples, or 1-3 seconds worth of samples over a 5 second period, or in any other manner. Thus, the timing threshold may indicate an amount of time it is desired for the user to be viewing the screen before presenting the cue. This attempts to ensure that the cue is presented in a relevant manner (e.g., when the user will actually see it).

In accordance with a determination that the user is not viewing the screen in excess of the timing threshold, the process 500 may return to the block 512 to obtain additional sensor data. In some examples, the process 500 may timeout and return to the block 502, if the determination at 516 is no more than a threshold number of times or after a threshold number of seconds attempting to find the user's face (e.g., after 30 seconds). This may help to conserve resources and battery life by not continuing to sample at the second sampling rate when a user has likely moved away from the electronic device 102.

In accordance with a determination that the user is viewing the screen in excess of the timing threshold, the process 500 proceeds to block 518. At the block 518, the process 500 includes the electronic device 102 presenting a cue (e.g., a notification). This may include the electronic device 102 causing the cue to be presented on the screen of the electronic device 102. The cue may cover the entirety of the screen (e.g., black out the screen) or cover less than all of the screen. The cue may be any suitable cue such as a bubble, a drop down, a graphic that changes shape and/or size, an icon, a haptic, a text for resolving the problem and/or removing the obstruction (e.g., "move your phone away from your face 5-10 cm to dismiss this notification"), a tone that changes depending on the viewing distance, a voice recording (e.g., a parent's voice telling a child to "Maggie, you are too close to your screen. Hold it further away from you"), and any other cue that may be used to prompt the user about the viewing distance. The cue may disrupt the content presented at the electronic device 102.

In some examples, presenting the cue may depend on a set of presentation rules. The set of presentation rules may define conditions for presenting and not presenting cues. For example, in some applications in which it is common for the user to look closely at the screen (e.g., for short periods of time), a rule may indicate that the cue be presented less frequently. The presentation rules may depend on and/or be specific to content, application, user, and the like. For example, in a navigation application, the notifications may be turned off entirely, while in a gaming application, the notifications may be turned on. The presentation rules may indicate a frequency at which a notification may be presented. For example, a first presentation rule may indicate that when content is being viewed in a video player, the notifications may be presented a first frequency. A second rule may indicate that when content is being viewed in a social media application, the notifications may be presented a second frequency. The distance thresholds and timing thresholds may also depend on and/or be specific to content, application, user, and the like.

Figure 6:
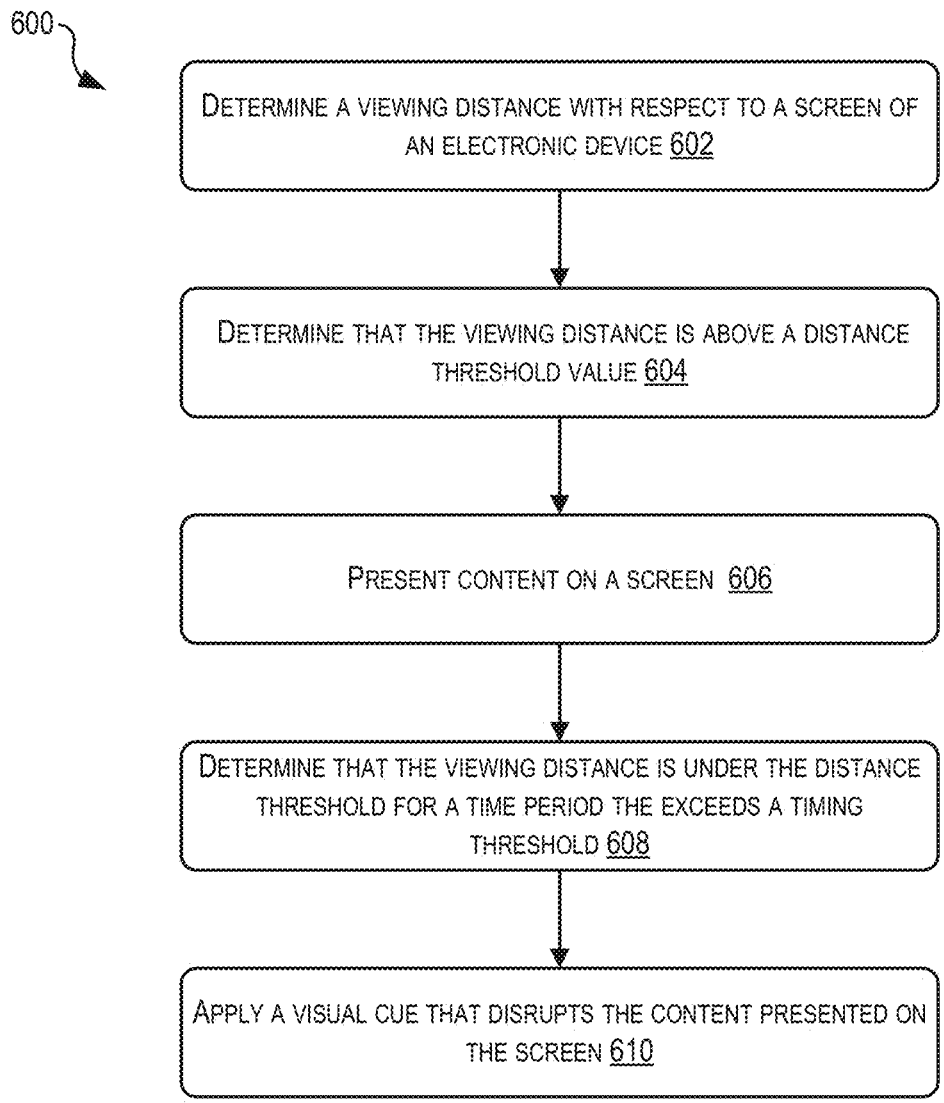
FIG. 6 is an example flow chart showing a process for illustrating example techniques for implementing near-viewing notification techniques, according to at least one example.

FIG. 6 is an example flow chart showing a process 600 for illustrating example techniques for implementing near-viewing notification techniques, according to at least one example. The process 600 is performed by the near-viewing control engine 206 executing in the electronic device 102 and/or the service provider 204.

The process 600 begins at block 602 by the electronic device 102 determining a viewing distance with respect to a screen of the electronic device 102. This may be performed in a similar manner as the block 508. The process 600 may also include, prior to determining the viewing distance, receiving first sensor data from a sensor of the electronic device. In this example, determining the viewing distance may be based at least in part on the first sensor data.

At 604, the process 600 includes the electronic device 102 determining that the viewing distance is above a distance threshold. This may include comparing the viewing distance with the distance threshold. In some examples, the viewing distance is configurable as a user setting. In some examples, the process 600 may also include receiving second sensor data from the sensor. The second sensor data may be different from the first sensor data. For example, the second sensor data may have been obtained at a different sampling rate and at a later time than the first sensor data.

At 606, the process 600 includes the electronic device 102 presenting content on the screen. The content on the screen may include any suitable content capable of being presented on the screen of the electronic device 102.

At 608, the process 600 includes the electronic device 102 determining that the viewing distance is under the distance threshold for a time period that exceeds a timing threshold. Using the timing threshold may ensure that the cue is not presented if the viewing threshold is exceeded for some limited duration. In some examples, the timing threshold (or a different timing threshold) may be used to determine when to present a cue (e.g., at a time when the user is looking at the device). Determining that the viewing distance is under the distance threshold may be based at least in part on the second sensor data.

At 610, the process 600 includes the electronic device 102 applying, a visual cue that disrupts the content presented on the screen. In some examples, the visual cue may be applied at least until the viewing distance returns to being above the distance threshold. In some examples, the visual cue may increase in size as the viewing distance decreases and decrease in size as the viewing distance increases. The visual cue may include at least one of an icon, a text string, or a set of opaque bars.

In some examples, the process 600 may further include the electronic device 102 storing an amount of time that the viewing distance is under the distance threshold. In this example, the amount of time may be usable for at least one of notification, health applications, or scientific analysis.

In some examples, the process 600 may further include the electronic device 102, in accordance with the determination that the viewing distance is under the distance threshold for the time period that exceeds the timing threshold, applying, until the viewing distance returns to being above the distance threshold, a haptic cue that increases in strength as the viewing distance decreases and decreases in strength as the viewing distance increases.

In some examples, determining the viewing distance of the face may include determining the viewing distance using first sensor data obtained using a first sampling rate. In this examples, determining that time period exceeds the timing threshold may include receiving second sensor data obtained using a second sampling rate, and identifying the face in the second sensor data.

Figure 7:
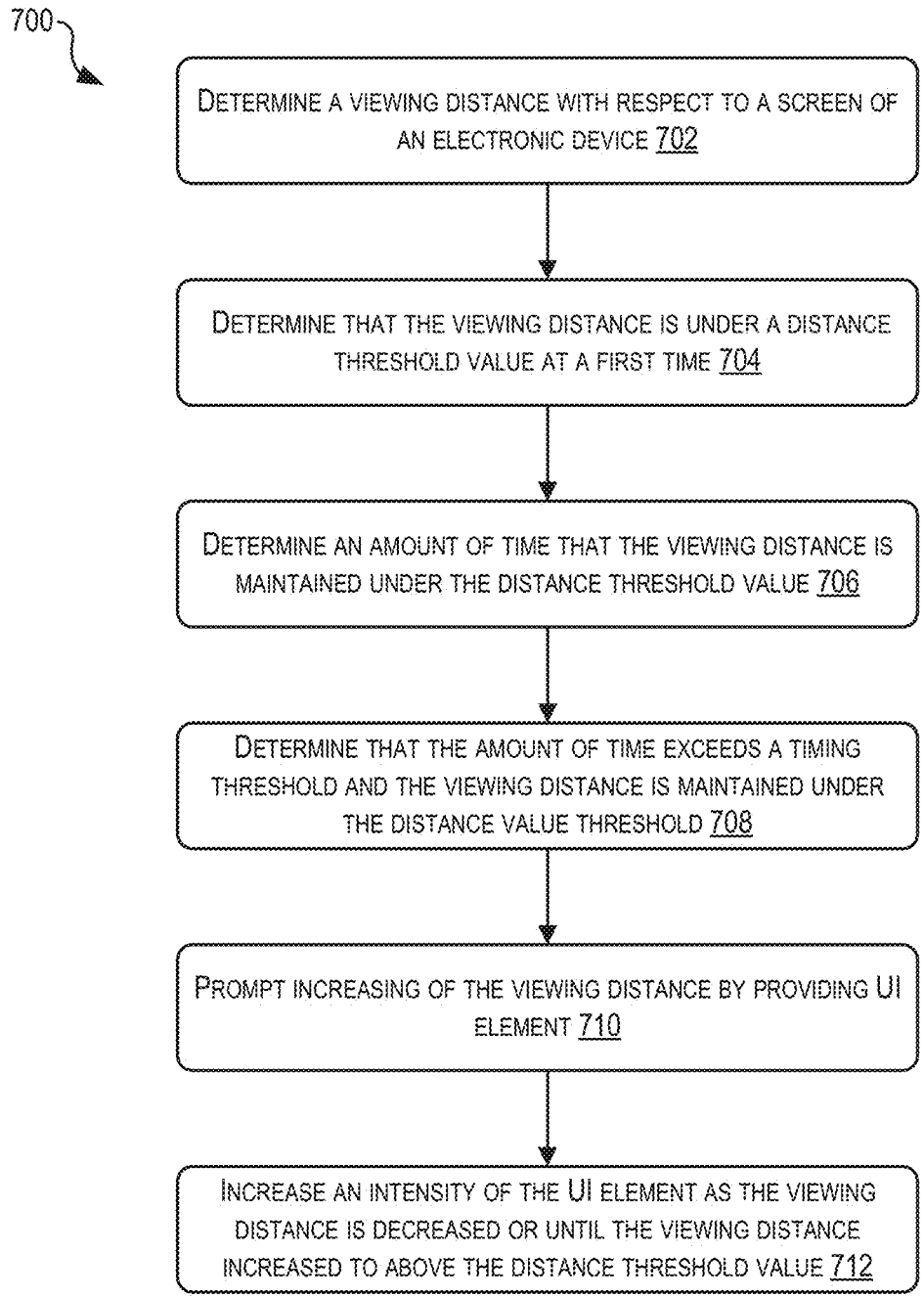
FIG. 7 is an example flow chart showing a process for illustrating example techniques for implementing near-viewing notification techniques, according to at least one example.

FIG. 7 is an example flow chart showing a process 700 for illustrating example techniques for implementing near-viewing notification techniques, according to at least one example. The process 700 is performed by the near-viewing control engine 206 executing in the electronic device 102 and/or the service provider 204.

The process 700 begins at block 702 by the electronic device 102 determining a viewing distance of a user with respect to a screen of the electronic device 102 (e.g., a distance between a face of the user and a screen of the electronic device 102). This may be performed in a similar manner as the block 508. In some examples, the process 700 may also include receiving, from a sensor of the electronic device 102, first sensor data, which may have been obtained at a first sampling rate.

In some examples, determining the viewing distance at the block 702 may include determining a set of valid samples based at least in part on the first sensor data, determining, within the set of valid samples, viewing distance values for a subset of valid samples that include viewing distance values under the distance threshold, and determining the viewing distance based on the subset of valid samples. In some examples, the determining the viewing distance may also include averaging the viewing distance values for the subset of valid samples.

At block 704, the process 700 includes the electronic device 102 determining that the viewing distance is under a distance threshold value at a first time. This may include determining based at least in part on the first sensor data.

At block 706, the process 700 includes the electronic device 102 determining an amount of time from the first time that the viewing distance is maintained under the distance threshold value. In some examples, the process 700 may also include receiving, from the sensor or from a different sensor of the electronic device 102, second sensor data, which may have been obtained at a second sampling rate that is different from the first.

At block 708, the process 700 includes the electronic device 102 determining that the amount of time exceeds a timing threshold and the viewing distance is maintained under the distance threshold value. This may include determining based at least in part on the second sensor data.

At block 710, the process 700 includes the electronic device 102 prompting increasing of the viewing distance by providing a user interface element. The user interface element may be presented at the screen of the electronic device 102. The user interface element may be a visual cue. The visual cue may have an opaque shape at a relative center of the screen, or any other shape, size, etc. The opaque shape may be initially at a first size.

In some examples, the visual cue may include opaque bars on sides of the screen. The opaque bars may be initially at a first size. In some examples, the user interface element may include a haptic cue or an audio cue.

At 712, the process 700 includes the electronic device 102 increasing an intensity of the user interface element as the viewing distance is decreased or until the viewing distance is increased to above the distance threshold value. In some examples, increasing the intensity of the user interface element may include increasing a size of an opaque shape from the first size to a second size. In some examples, increasing the intensity of the user interface element may include increasing a size of an opaque shape from the first size to a second size. At the second size, the opaque shape may be capable of encompassing the screen of the electronic device.

The process 700 may also include the electronic device 102 decreasing the intensity of the user interface element as the viewing distance is increased.

In some examples, the process 700 may also include receiving third sensor data from the electronic device 102, and identifying a bounding box that includes a face of a user based at least in part on the third sensor data. In this example, determining the viewing distance at the block 702 may include determining an average viewing distance of the face based at least in part on a portion of the first sensor data within the bounding box.

Figure 8:
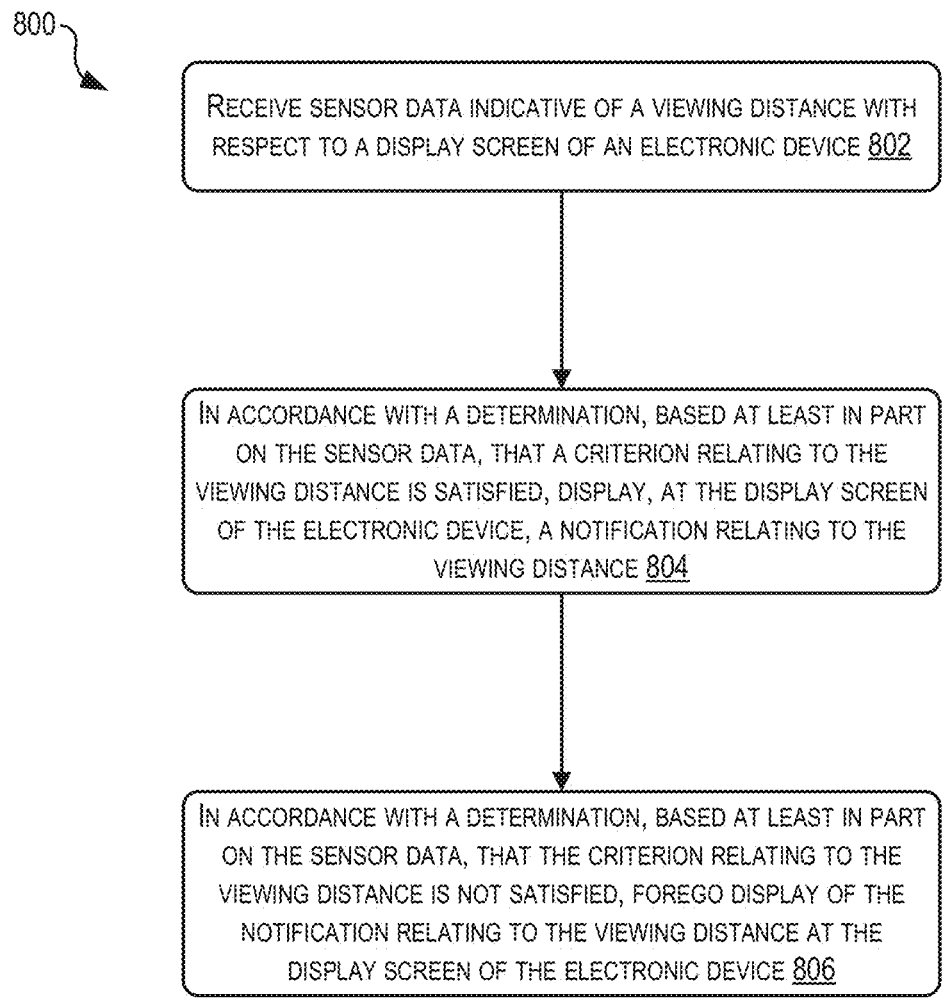
FIG. 8 is an example flow chart showing a process for illustrating example techniques for implementing near-viewing notification techniques, according to at least one example.

FIG. 8 is an example flow chart showing a process 800 for illustrating example techniques for implementing near-viewing notification techniques, according to at least one example. The process 800 is performed by the near-viewing control engine 206 executing in the electronic device 102 and/or the service provider 204.

The process 800 begins at block 802 by the electronic device 102 receiving sensor data indicative of a viewing distance with respect to a display screen of the electronic device. The sensor data may be received from a sensor of the electronic device that is configured to sense objects in front of the display screen. Sensor data that is indicative of the viewing distance may include data that is representative of the viewing distance, data from which the viewing distance may be derived without comparing to other data, and/or data from which the viewing distance may be derived by comparing to other data. In some examples, the viewing distance is configurable as a user setting.

Depending on the type of sensor used, the sensor data may include RGB or IR image data (e.g., from an RGB camera or IR camera), depth data (e.g., from a depth sensor), proximity data such as a signal indicating whether or not an object is detected (e.g., from a proximity sensor), time of flight data (e.g., timing data received from a ToF camera), data relating to projected light patterns (e.g., images from a structured light camera), or any other suitable data receivable from a sensor or camera for sensing conditions surrounding the electronic device 102.

At block 804, the process 800 includes the electronic device 102, in accordance with a determination, based at least in part on the sensor data, that a criterion relating to the viewing distance is satisfied, displaying, at the display screen of the electronic device 102, a notification relating to the viewing distance. The criterion may correspond to a distance threshold value, a timing threshold value, a presentation rule, and/or any other suitable criterion relating to the viewing distance.

In some examples, the determination at the block 804 may include determining the viewing distance based on the sensor data, and determining that the viewing distance is under a distance threshold (e.g., a criterion). This may mean that a user is too close to the display screen. In some examples, the block 804 is performed in a similar manner as the blocks 702, 704, and/or 706.

In some examples, the determination at the block 806 may also include determining whether the viewing distance remains under the distance threshold for an amount of time that exceeds a timing threshold (e.g., a criterion). In this example, the notification may be presented when both the viewing distance is too small for too long.

At block 806, the process 800 includes the electronic device 102, in accordance with a determination, based at least in part on the sensor data, that the criterion relating to the viewing distance is not satisfied, forego displaying of the notification relating to the viewing distance at the display screen of the electronic device 102.

In some examples, the determination at the block 806 may include determining the viewing distance based on the sensor data, and determining that the viewing distance is greater than the distance threshold (e.g., the criterion). This may mean that the user is not too close to the display screen.

In some examples, the sensor data is first sensor data obtained at a first sampling rate. In this example, the process 800 may further include receiving, from the sensor, second sensor data obtained at a second sampling rate, and determining a timing to display the notification in accordance with a determination, based at least in part on the second sensor data, that a second criterion relating to the viewing distance is satisfied. In some examples, the second sampling rate may be greater than the first sampling rate, and the first criterion may include a distance threshold value and the second criterion may include a timing threshold value.

In some examples, displaying the notification relating to the viewing distance may be based at least in part on content presented at the display screen. In some examples, the notification may obstruct all or substantially of the display screen (e.g., between 90-100% of the area of the display screen) or a portion of the display screen (e.g., less than 100% of the area of the display screen). In some examples, the notification may obstruct at least a portion of the display screen and may include a message for dismissal of the notification from the display screen. For example, the notification may be a popup and a message may include text describing that to dismiss the notification the user must increase the viewing distance.

In some examples, the process 800 may further include, while the notification is being displayed on the display screen, changing the notification in a first manner as the sensor data indicates that the viewing distance increases, and changing the notification in a second manner different from the first manner as the sensor data indicates that the viewing distance decreases.

In some examples, the process 800 may further include storing an amount of time that the criterion is satisfied, and populating a dashboard within a health application of the electronic device based at least in part on the amount of time.

In some examples, the process 800 may further include displaying content on the display screen. In this examples, displaying the notification relating to the viewing distance may disrupt the content on the display screen.

In some examples, the criterion may be satisfied (e.g., the block 804) when the viewing distance is below a distance threshold, and the criterion may not satisfied (e.g., the block 806) when the viewing distance is above the distance threshold.

Figure 9:
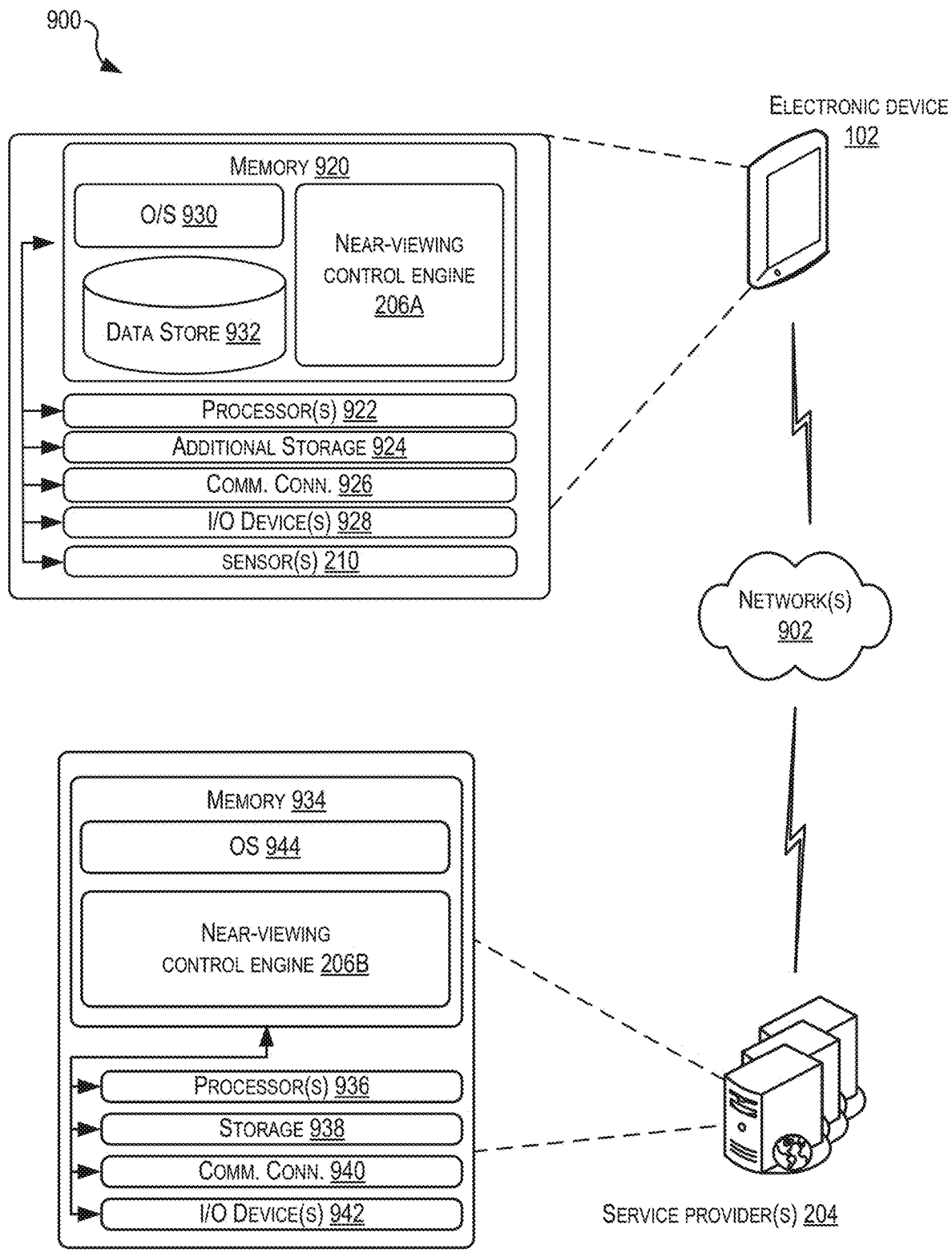
FIG. 9 is an example block diagram for illustrating a system for implementing the techniques described herein, according to at least one example.

FIG. 9 is an example block diagram for illustrating a system 900 for implementing the techniques described herein, according to at least one example. System 900 may include electronic device 102 and service provider 204 that may communicate with other devices via network(s) 902 networks utilizing any suitable communications protocol. The electronic device 102 can be any type of computing device accessible to a user, including a personal computer, a smart phone, a tablet, or the like.

In some examples, the networks 902 may include any one or a combination of many different types of networks, such as cable networks, the Internet, wireless networks, cellular networks, and other private and/or public networks.

As noted above, the electronic device 102 may be configured to execute or otherwise manage applications or instructions for presenting a user interface with near-viewing notification cues (e.g., via near-viewing control engine 206A). The electronic device 102 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, the electronic device 102 may include at least one memory 920 and one or more processing units (or processor(s)) 922. The processor(s) 922 may be implemented as appropriate in hardware, computer-executable instructions, or combinations thereof. Computer-executable instruction or firmware implementations of the processor(s) 922 may include computer-executable or machine-executable instructions written in any suitable programming language to perform the various functions described.

The memory 920 may store program instructions that are loadable and executable on the processor(s) 922, as well as data generated during the execution of these programs. Depending on the configuration and type of the electronic device 102, the memory 920 may be volatile (such as random access memory (RAM)) and/or non-volatile (such as read-only memory (ROM), flash memory, etc.). The electronic device 102 may also include additional removable and/or non-removable storage 924 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 920 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 920 and the additional storage 924, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 920 and the additional storage 924 are both examples of non-transitory computer storage media. Additional types of computer storage media that may be present in the electronic device 102 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the electronic device 102. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The electronic device 102 may also contain communications connection(s) 926 that allow the electronic device 102 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The electronic device 102 may also include I/O Device(s) 928, such as a touch input device, an image capture device, a keyboard, a mouse, a pen, a voice input device, a display, a speaker, a printer, etc. The electronic device 102 may also include the sensors 210, described herein.

Turning to the contents of the memory 920 in more detail, the memory 920 may include an operating system 930 and/or one or more application programs or services for implementing the features disclosed herein. The memory 920 may include data store 932 which may be configured to store image data and/or one or more models corresponding to one or more near-viewing control elements. The memory 920 may include the near-viewing control engine 206A.

The service providers 204 may also be any type of computing device such as, but not limited to, a mobile phone, a smartphone, a PDA, a laptop computer, a desktop computer, a thin-client device, a tablet computer, a wearable device, a server computer, a virtual machine instance, etc. In some examples, the service providers 204 may be in communication with the electronic device 102 via the network 902, or via other network connections.

In one illustrative configuration, the service providers 204 may include at least one memory 934 and one or more processing units (or processor(s)) 936. The processor(s) 936 may be implemented as appropriate in hardware, computer-executable instructions, firmware, or combinations thereof. Computer-executable instruction or firmware implementations of the processor(s) 936 may include computer-executable or machine-executable instructions written in any suitable programming language to perform the various functions described.

The memory 934 may store program instructions that are loadable and executable on the processor(s) 936, as well as data generated during the execution of these programs. Depending on the configuration and type of service provider 204, the memory 934 may be volatile (such as RAM) and/or non-volatile (such as ROM, flash memory, etc.). The service provider 204 may also include additional removable and/or non-removable storage 938 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 934 may include multiple different types of memory, such as SRAM, DRAM, or ROM. While the volatile memory described herein may be referred to as RAM, any volatile memory that would not maintain data stored therein once unplugged from a host and/or power would be appropriate. The memory 934 and the additional storage 938, both removable and non-removable, are both additional examples of non-transitory computer-readable storage media.

The service provider 204 may also contain communications connection(s) 940 that allow the service provider 204 to communicate with a data store, another computing device or server, user terminals and/or other devices via the network 902. The service provider 204 may also include I/O device(s) 942, such as a keyboard, a mouse, a pen, a voice input device, a touch input device, a display, speakers, a printer, etc.

Turning to the contents of the memory 934 in more detail, the memory 934 may include an operating system 944 and/or one or more application programs or services for implementing the features disclosed herein including the near-viewing control engine 206B.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from electronic devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering of behavioral data relating to how a user uses her electronic device. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital sign measurements, medication information, exercise information), date of birth, health record data, or any other identifying or personal or health information.

The present disclosure recognizes that the use of such personal information data, in the present technology, can be used to the benefit of users. For example, the personal information data can be used to provide enhancements to the user's experience with her electronic device. Further, other uses for personal information data that benefit the user are also contemplated by the present disclosure. For instance, behavioral data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data.

What is claimed is:

1. One or more non-transitory computer-readable media comprising computer-executable instructions that, when executed by one or more processors of an electronic device, cause the one or more processors to perform operations comprising:
   displaying content of a first application at a display screen of the electronic device;
   determining that presentation of a user cue relating to distance is permitted in the first application according to a first set of presentation rules specific to a first application and that presentation of the user cue relating to distance is prohibited in a second application according to a second set of presentation rules;
   receiving, from a sensor of the electronic device, first sensor data indicative of a first distance between the electronic device and an object;
   determining based at least in part on the first sensor data, that a first criterion relating to the first distance is satisfied;
   in accordance with determining that the first criterion relating to the first distance is satisfied and in accordance with the first set of presentation rules, presenting a first version of the user cue relating to the first distance;
   while the content is being displayed at the display screen and while the first version of the user cue is being presented, receiving, from the sensor of the electronic device, second sensor data indicative of a second distance between the electronic device and the object;
   determining based at least in part on the second sensor data, that a second criterion relating to the second distance is satisfied; and
   in accordance with determining that the second criterion relating to the second distance is satisfied and in accordance with the first set of presentation rules, presenting a second version of the user cue relating to the second distance, wherein one or more properties of the user cue are distinct between the first version and the second version.

2. The one or more non-transitory computer-readable media of claim 1, wherein each of the first criterion and the second criterion is based at least in part on a distance threshold value.

3. The one or more non-transitory computer-readable media of claim 1, wherein the object comprises a human.

4. The one or more non-transitory computer-readable media of claim 1, wherein the user cue comprises at least one of a textual visual notification, a graphical visual notification, a haptic notification, or an audio notification.

5. The one or more non-transitory computer-readable media of claim 1, wherein the user cue comprises two or more of a textual visual notification, a graphical visual notification, a haptic notification, or an audio notification.

6. The one or more non-transitory computer-readable media of claim 1, wherein the first version of the user cue includes the first distance and the second version of the user cue includes the second distance.

7. The one or more non-transitory computer-readable media of claim 1, wherein an intensity of the user cue increases as distance between the electronic device and the object decreases.

8. A computer-implemented method, comprising:
   displaying content of a first application at a display screen of an electronic device;
   determining that presentation of a user cue relating to distance is permitted in the first application according to a first set of presentation rules specific to a first application and that presentation of the user cue relating to distance is prohibited in a second application according to a second set of presentation rules;
   receiving, from a sensor of the electronic device, first sensor data indicative of a first distance between the electronic device and an object;
   determining based at least in part on the first sensor data, that a first criterion relating to the first distance is satisfied;
   in accordance with determining that the first criterion relating to the first distance is satisfied and in accordance with the first set of presentation rules, presenting a first version of the user cue relating to the first distance;
   while the content is being displayed at the display screen and while the first version of the user cue is being presented, receiving, from the sensor of the electronic device, second sensor data indicative of a second distance between the electronic device and the object;
   determining based at least in part on the second sensor data, that a second criterion relating to the second distance is satisfied; and
   in accordance with determining that the second criterion relating to the second distance is satisfied and in accordance with the first set of presentation rules, presenting a second version of the user cue relating to the second distance, wherein one or more properties of the user cue are distinct between the first version and the second version.

9. The computer-implemented method of claim 8, wherein each of the first criterion and the second criterion is based at least in part on a distance threshold value.

10. The computer-implemented method of claim 8, wherein the object comprises a human.

11. The computer-implemented method of claim 8, wherein the user cue comprises at least one of a textual visual notification, a graphical visual notification, a haptic notification, or an audio notification.

12. The computer-implemented method of claim 8, wherein the user cue comprises two or more of a textual visual notification, a graphical visual notification, a haptic notification, or an audio notification.

13. The computer-implemented method of claim 8, wherein the first version of the user cue includes the first distance and the second version of the user cue includes the second distance.

14. The computer-implemented method of claim 8, wherein an intensity of the user cue increases as distance between the electronic device and the object decreases.

15. An electronic device, comprising:
a display screen;
a sensor configured to sense objects with respect to the electronic device;
a memory configured to store computer-executable instructions; and
a processor configured to access the memory and execute the computer-executable instructions to at least:
 display content of a first application at the display screen;
 determining that presentation of a user cue is permitted in the first application according to a first set of presentation rules specific to a first application and that presentation of the user cue is prohibited in a second application according to a second set of presentation rules;
 receive, from a sensor of the electronic device, first sensor data indicative of a first distance between the electronic device and an object;
 determine based at least in part on the first sensor data, that a first criterion relating to the first distance is satisfied;
 in accordance with determining that the first criterion relating to the first distance is satisfied and in accordance with the first set of presentation rules, present a first version of the user cue relating to the first distance;
 while the content is being displayed at the display screen and while the first version of the user cue is being presented, receive, from the sensor of the electronic device, second sensor data indicative of a second distance between the electronic device and the object;
 determine based at least in part on the second sensor data, that a second criterion relating to the second distance is satisfied; and
 in accordance with determining that the second criterion relating to the second distance is satisfied and in accordance with the first set of presentation rules, present a second version of the user cue relating to the second distance, wherein one or more properties of the user cue are distinct between the first version and the second version.

16. The electronic device of claim 15, wherein each of the first criterion and the second criterion is based at least in part on a distance threshold value.

17. The electronic device of claim 15, wherein the object comprises a human.

18. The electronic device of claim 15, wherein the user cue comprises at least one of a textual visual notification, a graphical visual notification, a haptic notification, or an audio notification.

19. The electronic device of claim 15, wherein the user cue comprises two or more of a textual visual notification, a graphical visual notification, a haptic notification, or an audio notification.

20. The electronic device of claim 15, wherein the first version of the user cue includes the first distance and the second version of the user cue includes the second distance.

* * * * *